United States Patent [19]
McKeon

[11] Patent Number: 5,926,552
[45] Date of Patent: Jul. 20, 1999

[54] SYSTEM AND PROCESS FOR GUARANTEEING SIGNATURES ON SECURITIES

[76] Inventor: Paul McKeon, 76 Maywood Rd., W. Norwalk, Conn. 06850

[21] Appl. No.: 08/788,686

[22] Filed: Jan. 24, 1997

[51] Int. Cl.⁶ .......................................................... H04L 9/00
[52] U.S. Cl. .................................................. 380/51; 380/24
[58] Field of Search ................................. 380/23, 24, 51, 380/55

[56] References Cited

U.S. PATENT DOCUMENTS

| | | |
|---|---|---|
| 4,953,085 | 8/1990 | Atkins . |
| 5,025,373 | 6/1991 | Keyser, Jr. et al. . |
| 5,059,245 | 10/1991 | Phillips et al. . |
| 5,113,445 | 5/1992 | Wang . |
| 5,117,356 | 5/1992 | Marks . |
| 5,204,681 | 4/1993 | Greene . |
| 5,497,317 | 3/1996 | Hawkins et al. . |
| 5,502,637 | 3/1996 | Beaulieu et al. . |
| 5,535,407 | 7/1996 | Yanagawa et al. . |
| 5,671,282 | 9/1997 | Wolff et al. ................................. 380/51 |
| 5,680,463 | 10/1997 | Windel et al. ............................. 380/51 |

Primary Examiner—David Cain
Attorney, Agent, or Firm—Collard & Roe, P.C.

[57] ABSTRACT

A system and process for guaranteeing the signatures on securities to be transferred, comprising an electronic storage medium adapted to generate a profile of an individual guarantor enrolled in a signature guarantee program. The profile is divided into fields which can be sorted and used to generate all program documents and reports related to each guarantor. The storage medium maintains lists of qualified guarantors for access by transfer agents. A medallion(s) is issued to each guarantor, carrying information to identify the guarantor. Application of the medallion to a security notifies a transfer agent that the signature authorizing the transfer of the security is valid and in conformance with the law as set forth in the Uniform Commercial Code of the United States. A communications system is connected to the database and is adapted to transmit information from a selected profile in the database to a manufacturer for shipment of an individualized medallion directly to a guarantor. The communications system is also adapted to transmit a list of guarantors and lists of lost, stolen or destroyed medallions to transfer agents.

30 Claims, 3 Drawing Sheets

SYSTEM AND PROCESS FOR GUARANTEEING SIGNATURES ON SECURITIES

BACKGROUND OF THE INVENTION

1. Field of the Invention

This invention relates to an automated system for generating, processing and monitoring signature guarantees on transfers of securities. In particular, the invention relates to an automated system and process for guaranteeing security transfers by issuing customized medallions to guarantors who guarantee the transfer by affixing that medallion to the security.

2. Prior Art

Automated or computerized business systems are known. For example, U.S. Pat. No. 5,497,317 discloses a device and method for improving the speed and reliability of security trade settlements through the use of computer databases connected to communication means, and transmitters for relaying broker instructions and account information in the databases to receivers for settling a securities trade.

U.S. Pat. No. 5,502,637 discloses a computerized investment research delivery system that comprises a host for receiving investment research, a transmitter for transmitting the research to a remote database, and means for deleting information that has been stored for a long period of time.

U.S. Pat. No. 5,535,407 discloses a host computer for managing customer data and a plurality of interconnected processors for receiving the data and transmitting updated data back to the host computer. All of these known systems disclose the use of computers connected to a communication means with other databases or processors for the transmission of data between the different systems.

Thus, the use of computerized communication systems for business transactions is known. However, none of the prior art discloses a system using a computerized database with a communication system for managing a signature guarantee program for authenticating security transfers. Such a program is necessary to facilitate the efficient transfer of securities from one owner to another.

Previously, all signature guarantees were authenticated by several separate entities, in a haphazard and decentralized manner. In addition, all signature guarantees were performed manually, utilizing signature cards on file at each guarantor company and register with each transfer agent, thus requiring excessive time and effort on behalf of the transfer agents in the authentication process. In addition, manual authentication increases the risk of errors in the system. It is thus desirable to have a single, centralized program that efficiently processes all signature guarantees in an easy manner, and which also ensures reliability at all stages of the transfer process. With a qualified process and system, the entire process could be bonded and insured to protect the vital interests of all capital market participants against fraud, criminal acts and infidelity of guarantors and their employees.

SUMMARY OF THE INVENTION

It is therefore an object of the present invention to provide a system and process for managing a signature guarantee program that enables the efficient, accurate reliable and secure process for the transfer of securities from one owner to another.

It is another object of the invention to provide a system and process for managing the enrollment of guarantors in the program through a centralized computer database.

It is yet another object of the invention to provide a system for issuing individual customized medallions to each guarantor to guarantee the signature on each security to be transferred.

It is yet another object of the invention to provide a system for monitoring the use of the individual guarantors's medallions and notifying transfer agents of lost, stolen or destroyed medallions.

It is a further object of the invention to provide a system and process for electronically guaranteeing signatures, without the need to physically present a document to a guarantor.

The system according to the invention works as follows: When an entity such as a bank, broker or credit union desires to enroll in the program and become a guarantor for security transfers, the prospective guarantor contacts the program via a computer network such as the internet, or by facsimile or mail, and obtains application materials. The application materials include a program application and subscription agreement, indemnity agreement, executed surety bond or surety bond application or insurance application, and equipment order form. A surety bond or insurance is required to provide financial protection to the security transfer agent against a fraudulent guarantee. The guarantor completes the application materials and submits them to the program.

A program administrator evaluates the application materials, and, if they are in good order, admits the guarantor to the program. At this stage, a guarantor profile is created in an electronic storage system such as a computer database, containing all of the pertinent information about the guarantor. The database can be of any type or form, but is preferably adapted from Lotus Notes™. The information about the guarantor is entered into specific fields on the database to enable automatic generation of correspondence, billing and other files.

The original program documents that the guarantor has submitted are scanned into the computer using an imaging system and are linked to the corresponding profile that has been created in the database. The documents and database are then accessible via the internet or other on-line network to transfer agents to meet their processing needs, or can be sent to the transfer agent by the program via facsimile or mail.

Once a guarantor has been admitted to the program, the program issues a customized, individual medallion to the guarantor. Each guarantor has a unique medallion that identifies the guarantor. The program can also accommodate the production of a unique medallion for each guarantor provided for a stockholder. The medallion is labeled with a guarantor number to identify the guarantor and a location code to identify the location of the branch using that particular medallion. When a security transfer is to be authenticated, the guarantor affixes the medallion to the security.

To obtain the medallion, the guarantor completes a medallion order form and submits the order to the program, either electronically via the internet or facsimile, or by mail. The order is then placed in the database, either automatically if the order was sent in over the internet, or by facsimile, or manually by one of the program employees, if the order was placed by mail or other non-electronic form. The database system then electronically transmits a file to the manufacturer for production of the medallion.

The database keeps a centralized record of all guarantors and their medallion(s). Each guarantor is obligated under the program to notify the program if any medallion is lost, stolen or destroyed. The program enters this information into the database which automatically notifies all transfer agents that the medallion is invalid.

The signature guarantee process works as follows: A selling stockholder seeks the services of a qualified guarantor to obtain a signature guarantee. The guarantor qualifies the stockholder under the rules set forth under the Uniform Commercial Code for the United States. This guarantee is a message to the transfer agent that the security is being transferred with the authorization of the selling stockholder. Under the program, the guarantor affixes the customized medallion to the stock certificate or transfer request, which is then sent to the transfer agent for sale or transfer. The transfer agent can contact the program administrator, either by telephone, facsimile or an on-line computer network, to qualify the authenticity of the medallion. The program database is connected to an on-line site that can be accessed via an on-line server. The on-line site provides all enrollment forms and materials for prospective guarantors, a list of qualified guarantors and a master file so that transfer agents can check the authenticity of a medallion and qualify the guarantor.

If the medallion is determined to be valid, the transfer agent can then proceed with the transfer of the security. If the medallion has been reported lost, stolen or destroyed, all transfer agents will be notified by the system, via periodic broadcast facsimile, bulk electronic mail or other messaging service that the medallion is no longer valid, and the transfer agent will then cease the transfer proceedings on any such transfer request.

The medallion can be affixed to a security in many ways, such as by a stamp which penetrates the certificate stock or a non-removable sticker. A security system(s) are also provided to protect the medallion from counterfeiting. If the medallion is in the form of a stamp, customized ink can be supplied for the stamp so that the imprint cannot be duplicated by unauthorized users. In particular, ink that changes color when viewed from different angles can be used. An example of this type of ink is described in U.S. Pat. No. 5,059,245, the disclosure of which is herein incorporated by reference. The particular ink used would be unique to the program so that unauthorized duplication could not occur.

Another possible security method is the use of radio frequency technology which can be added to an ink or made part of the stock of a sticker. This technology utilizes micron level resonant materials that can be read and encoded for various unique data. This data is then read by a scanner. An example of this technology is described in U.S. Pat. No. 5,204,681, the disclosure of which is herein incorporated by reference. The materials can either be embedded in the ink for the medallion stamp, or in a sticker on which the medallion is affixed. If the radio frequency target material is contained in the sticker glue, any attempts to remove the sticker or tamper with the medallion will disrupt the radio frequency material and the attempted fraud could be easily detected. This way, unique signature data can be embedded within the medallion to provide a further security measure.

Yet another possible security measure is the use of a two-dimensional bar code as the medallion. An example of such a bar code is described in U.S. Pat. No. 5,113,445, the disclosure of which is herein incorporated by reference. The bar code would contain any number of identifying numbers or algorithms which encode for the guarantor's signature information, including its name, identification numbers and PIN codes. The bar code can be read by a scanning device to provide a transfer agent who has the proper code to read the encrypted date with all of the necessary signature information. In addition, a unique bar code could be produced by a guarantor from a database/encryption system provided by the program administrator and used for every transfer guarantee. This unique code would also include the stockholder and certificate information as well.

When the unique bar code is used, the transfer agent can scan the bar code and the scanned information could then be directly uploaded to a computer file. This way, the transfer agent's records of the security transfer could be directly uploaded into the transfer agent's database without the need for extra data input by the transfer agent. Additionally, the transfer agent can scan the entire stock certificate using an imaging system, append the above data as an index file, and keep a computerized file of the entire transfer, thus eliminating the need to retain the paper certificate.

The use of a bar code as the medallion enhances the security of the transfer because the information cannot be read on sight, but must be decoded with an appropriate scanner and by a private algorithm. Preferably, the bar code is affixed by a sticker, since printing or stamping the bar code directly on a security could make reading the code difficult. However, the bar code could be printed directly on the security if the printing is of sufficiently high quality so as to be read by a scanner.

Additionally, combinations of the unique ink, radio frequency technology and two-dimensional bar codes can be used together to further increase the security of the transfer. For example, a two-dimensional bar code could be printed on a sticker having radio frequency resonant material embedded in the sticker glue.

Other security measures to protect the integrity of the program against counterfeiting and fraud could also be envisioned.

In an alternative embodiment, the guarantor may electronically issue a signature guarantee via transmission of an electronic file containing stockholder data directly to the transfer agent. This electronic guarantee eliminates the need to affix a medallion directly to the security itself, and thus eliminates the need for the selling stockholder to actually present the stock certificate to the guarantor prior to transfer. In this way, the selling stockholder can merely notify the guarantor of the intent to transfer when the guarantor has previously qualified the stockholder request, allowing the stockholder to present a transfer request directly to the transfer agent.

The electronic guarantee process works as follows: A transfer agent who desires to receive electronic guarantees contacts the program, who is then assigned a transfer agent code.

A selling stockholder contacts a guarantor and advises them of the desired transfer. Each guarantor in the program is assigned a personal identification number (PIN) to identify the guarantor in the system database. The guarantor contacts the program database via an on-line computer network or facsimile, using the guarantor's PIN and inputs the stockholder name, address, telephone number, stock certificate number, CUSIP number and the transfer agent code. This information is then directed to the transfer agent by the transfer agent code. The program then issues a specific locator code to the transaction. This locator code can then be recorded on the stock certificate or appended to the certificate on a separate document. This process uses public key/private key encryption to ensure data security. Confirmation codes on both sides of the transaction form the basis for qualifying the transmission.

When the actual stock certificate is presented to the transfer agent, the agent uses the locator code provided to locate the guarantee file in the program database, which then provides the guarantor's instructions, PIN and certificate number and other data directly to the transfer agent. This transmission can occur via an on-line computer network, facsimile, or other means. If all of the information is in order, the transfer agent can proceed with the stock transfer.

To provide the maximum security for the electronic transfer of signature guarantees, the program utilizes a public key/private key encryption process, whereby the guarantor transmits encrypted instructions to the transfer agent, who then decrypts or decodes the message. This encryption program is preferably Lotus Notes™ encryption, but other encryption programs may also be used.

As an additional security method, radio frequency material, which creates a unique electronic document profile, or a two-dimensional bar code, which creates a unique encrypted data profile, could be incorporated into the certificate as it is printed. The radio frequency or bar code would contain specific encrypted information providing an electronic signature identifying each specific document and certificate issued by a transfer agent. Upon receiving a certificate for transfer, the transfer agent could scan the certificate, decrypt the information and verify its authenticity by reading the bar code or radio frequency material and matching such data or electronic signature with that in a secure database.

If authorized by the transfer agent, a guarantor with a reading technology, upon receiving the certificate, can scan the bar code or radio frequency material and incorporate the scanned encrypted information into an electronic file and present an electronic guarantee based on encrypted data. If the certificate information is encrypted and cannot be read by the guarantor, the transfer agent receiving the electronic guarantee can decrypt the information and match it to the certificate's electronic profile when it is received.

The transfer agent can also transfer the scanned information directly from a bar code or a linking algorithm based on the radio frequency technology to their computer database, and thus eliminate the need to manually pull up a transfer file.

This process ensures that both the guarantor and transfer agents receive authentic certificates and further serves to prevent fraud in the process as only those authorized parties with the software to read the encrypted data can authorize a guarantee to transfer.

The system is completely centralized and keeps track of every single medallion, or in the case of electronic guarantees, every PIN code that is used to authenticate the signatures on securities to be transferred. The system enables reliable, quick and efficient transfers of securities all over the world.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
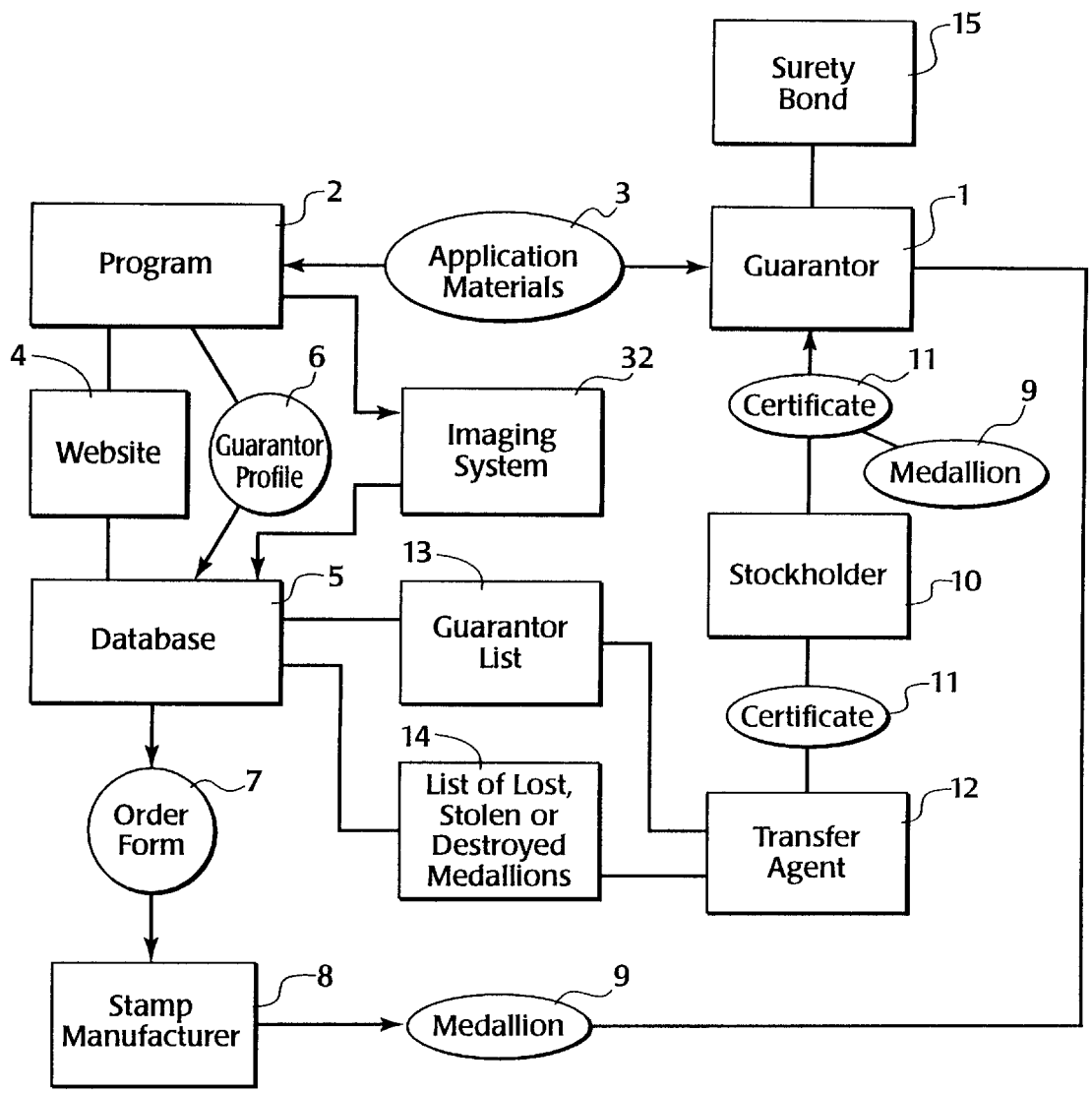
FIG. 1 is a flow diagram of the system according to the invention.

Turning now in detail to the drawings, and in particular FIG. 1, there is shown a schematic flow diagram of the system of the present invention. A guarantor 1, who desires to be part of the signature guarantee program 2, contacts program 2 to obtain application materials 3. The communication may take place by mail, telephone, facsimile, or on-line service such as by contacting the program's internet website 4. Guarantor 1 completes application materials 3 and sends the completed materials, which include an indemnity agreement, subscription agreement, executed surety bond, and medallion order form back to the administration of program 1, along with an enrollment fee.

The Subscription agreement contained in application materials 3 contains requests for information from the guarantor, such as the guarantor's name, address, telephone number, facsimile number, gross assets, primary blanket bond carrier, financial institution blanket bond limit, bond deductible, and estimated number of signature guarantees the guarantor expects to perform each year. The subscription agreement may also contain a contract for enrollment in the program, setting out the guarantor's responsibilities and duties to comply with program requirements.

Guarantor 1 obtains a surety bond 15, to perform the duties and financial obligation of the guarantor. An administrator of the program receives application materials 3 and proceeds to enter information recorded on the subscription agreement into database 5 which is installed in a computer, to create a guarantor profile 6. The computer can be any type of desktop model, and preferably has a Pentium™ or 586 processor with a minimum operating speed of 66 Mz, 16 megabytes of RAM and 100 megabytes of storage capacity.

All application materials 3 are also scanned into the computer using an optical imaging system 32 and the images are linked to guarantor profile 6 in database 5. The actual papers of application materials 3 are stored in a secure storage area.

Guarantor profile 6 can be used by program 2 to automatically generate correspondence, order forms and other documents pertaining to each guarantor. The program also periodically updates guarantor profile 6 as any additional information is received from guarantor 1 at their request. Once profile 6 has been created, database 5 can generate a medallion order form 7 as requested by guarantor 1 and send it to medallion manufacturer 8. Medallion manufacturer 8 makes one or more customized medallions 9 by importing the information from an electronic file through manual input, and sends them directly to guarantor 1 confirming this to the program administrator.

Order form 7 contains information extracted from guarantor profile 6, to identify the guarantor. The system then issues a unique medallion number. Medallion 9 is customized to identify guarantor 1 to the program and to transfer agents. Medallion 9 is affixed to securities and transfer requests and identifies the guarantor.

Figure 2:
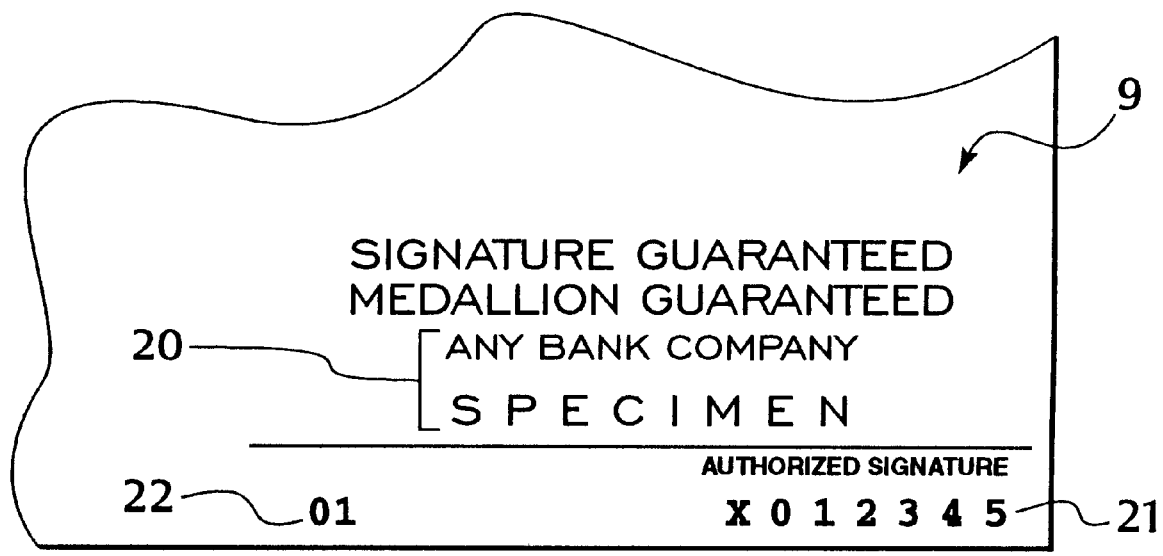
FIG. 2 is a representative medallion issued by the program.

A sample imprint of medallion 9 is shown in FIG. 2. Medallion 9 contains the name of the guarantor 20, a guarantor identification number 21, that identifies the guarantor to the program and to transfer agents, and a location code 22, for identifying the exact location of the specific medallion, such as one branch of a bank that has medallions in several branches. The logic for the coding may or may not be known to the program.

As shown in FIG. 1, a stockholder 10 or its authorized representative, who desires to sell shares of his stock, approaches a guarantor 1, to guarantee the stockholder's signature on the stock certificate 11 by qualifying the affixing medallion 9 to certificate 11. Stockholder 10 then takes certificate 11 to a transfer agent 12, to transfer the stock. Transfer agent 12 is informed by medallion 9 that the transfer of the stock is guaranteed by guarantor 1, who is identified by medallion 9. Transfer agent 12 may also contact program 2 through database 5 to double-check that guarantor 1 is part of program 2 and that medallion 9 is valid. Transfer agent 12 can obtain lists of qualified guarantors 13 from database 5 through contacting website 4, or by other electronic means, facsimile, telephone or mail to program 2.

Program 2 requires all guarantors to notify program 2 of any changes in the guarantor's business or if any medallions have been lost, stolen or destroyed. This information is entered into database 5 and all transfer agents 12 are systematically notified based on program procedures via broadcast facsimile, bulk e-mail or any other type of messaging service of any changes in the guarantor list or of any lost, stolen or destroyed medallions.

Figure 3:
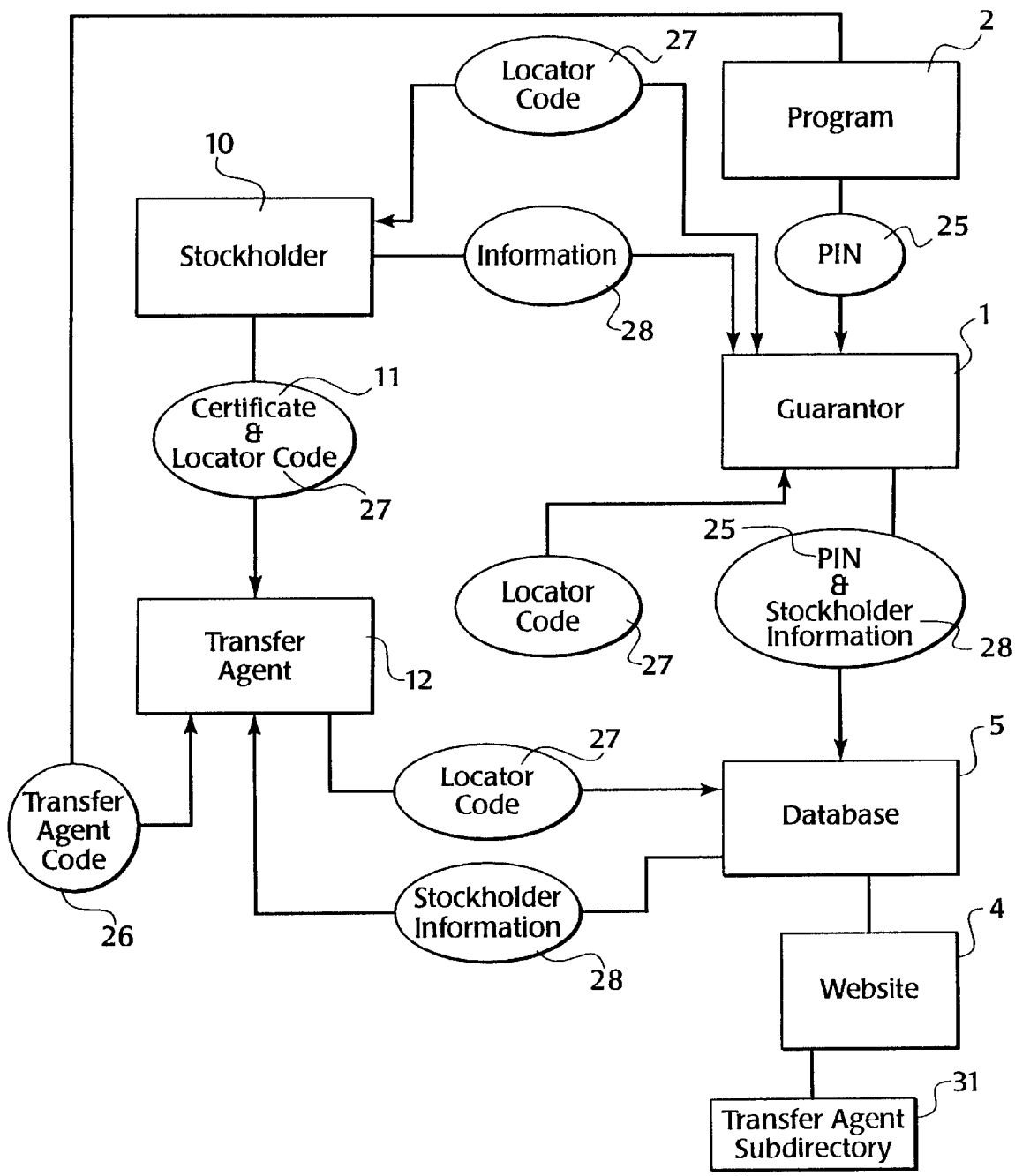
FIG. 3 is a diagram of the electronic guarantee process according to the invention.

A flow diagram of the electronic guarantee process is shown in FIG. 3. This process may be used by guarantors in place of medallions on the stock certificates to guarantee a transfer guarantor. Program 2 issues guarantor 1 a personal identification number (PIN) 25 that enables guarantor 1 to access database 5 for electronically guaranteeing stock transfers. Program 2 also issues each transfer agent a transfer agent code 26, that identifies each transfer agent to the program 2 and guarantor 1.

Selling stockholder 10 contacts guarantor 1, either in person or by other means and requests a guarantee of the transfer. Guarantor 1 qualifies the person, according to guarantor's internal procedures. If the request is not made in person, stockholder 10 provides guarantor 1 with information 28, comprising the stockholder's name, address, certificate number and CUSIP number, or another unique number such as a PIN to qualify the person. Guarantor 1 then accesses database 5 through website 4 or by other means, using PIN 25. Once guarantor 1 has gained access to the database, guarantor 1 then enters stockholder information 28 and transfer agent code 26, to initiate a guarantee of a transfer.

The system assigns a locator code 27 to the transfer, which is communicated to guarantor 1 from database 5. Locator code 27 is then placed directly on the stock certificate 11 by the guarantor or stockholder or attached thereto on a separate sheet.

Stockholder 10 or its authorized representative then takes certificate 11 with locator code 27 to transfer agent 12 for transfer. Using locator code 27, transfer agent accesses database 5 using transfer agent code 26 and locates guarantor 1's instructions, including stockholder information 28 to guarantee the transfer.

The transmission of the information from guarantor 1 to database 5 to transfer agent 12 is preferably effectuated via the program's website 4, which is connected to database 5 and accessible by any conventional internet server. Internet site 4 preferably contains a subdirectory 31 for each transfer agent in the program, so that a transfer agent 12 can obtain instructions from a guarantor 1 by contacting subdirectory 31 on internet site 4 using transfer agent code 26.

This way, the stockholder never has to present the certificate to the guarantor to have a stock transfer guaranteed.

All communications between stockholder 10, guarantor 1 and program 2 can take place electronically.

Accordingly, while only several embodiments of the present invention have been shown and described, it is obvious that many changes and modifications may be made thereunto without departing from the spirit and scope of the invention.

What is claimed is:

1. A system for guaranteeing the signatures on securities to be transferred, comprising:

an electronic storage medium adapted to receive guarantor information and generate a profile of a guarantor to be enrolled in a signature guarantee program, said profile being fully integrated and adapted to be sorted and used to generate documents including correspondence, order forms and regulatory reports related to each guarantor and program activity, wherein said storage medium maintains a list of qualified guarantors for access by transfer agents to qualify guarantee;

a medallion containing information sufficient to identify an individual guarantor, wherein the application of the medallion on a security notifies a security transfer agent that the signature authorizing the transfer of the security is valid; and an integrated communication system connected to said storage medium, said communication system adapted to transmit information from a selected profile in the database to a medallion manufacturer for shipment of an individualized medallion directly to a guarantor and transmit a confirmation to a guarantor and a program administrator that a medallion order was processed.

2. The system according to claim 1, wherein the communication system is further adapted to transmit a list of qualified guarantors to transfer agents and market regulators.

3. The system according to claim 1, wherein the communication system is further adapted to transmit a list of lost, stolen or destroyed medallions to transfer agents.

4. The system according to claim 1, further comprising an imaging system capable of scanning information submitted by a guarantor enrolling in the program, storing said information in a computer and linking such stored information to the electronic storage medium.

5. The system according to claim 1, further comprising an on-line communication access site connected to the electronic storage medium and containing forms for guarantors to enroll in the signature guarantee program and lists of qualified guarantors, wherein the access site is connected to the communications system, such that an individual connecting to the access site may obtain enrollment forms, lists of qualified guarantors and any such data as they are authorized.

6. The system according to claim 1, wherein the communication system includes a message system connected to the storage medium, the message system being adapted to contact transfer agents to notify them of changes in the guarantor registration and of lost, stolen or destroyed medallions.

7. The system according to claim 1, wherein the medallion is affixed to the security in the form of an inked stamp.

8. The system according to claim 7, wherein the ink used to affix the medallion to a security changes color when viewed from different angles.

9. The system according to claim 1, wherein the medallion is affixed to the security in the form of a glued sticker.

10. The system according to claim 9, further comprising radio frequency resonant material embedded within the sticker glue and sticker stock, wherein the resonant material contains unique identification information, and wherein tampering with the sticker disrupts the resonant material and scrambles the unique information, voiding the transfer.

11. The system according to claim 7, further comprising radio frequency resonant material embedded within the ink and security stock, wherein the resonant material encodes for specific information about the specific medallion which information can be held in a transfer agent system as an algorithm for future qualification of a document.

12. The system according to claim 1, wherein the medallion comprises a two-dimensional bar code.

13. The system according to claim 12, wherein the bar code is unique for each security transferred.

14. A process for guaranteeing the signatures on securities to be transferred, comprising:

enrolling guarantors in a signature guarantee program;
inputting information submitted by enrolled guarantors for storage;
creating a profile for each guarantor, said profile being divided into fields that can be used to automatically generate documents and reports required to manage the program;
linking the created profile to the input information;
ordering at least one medallion for each guarantor, comprising electronically sending a request to a medallion manufacturer and sending said medallions to the guarantors, wherein each medallion identifies an enrolled guarantor;
providing a list of enrolled guarantors that is accessible to transfer agents and regulators;
transmitting lists of lost, stolen or destroyed medallions to transfer agents and regulators; and
guaranteeing a signature on a security to be transferred by affixing a guarantor's medallion on the security, which medallion can then be verified by a transfer agent against the list of guarantors.

15. The process of claim 14, wherein the guarantor profile and list of guarantors is stored in a secure computer database.

16. The process of claim 14, wherein the step of providing a list of qualified guarantors may be accomplished using an on-line computer access site.

17. The process of claim 14, wherein the step of transmitting lists of lost, stolen or destroyed medallions is accomplished using a broadcast facsimile system.

18. The process according to claim 14, wherein the medallion comprises a two-dimensional bar code.

19. The process according to claim 18, wherein the bar code is unique for each security transfer.

20. The process according to claim 14, wherein the medallion is affixed to the security in the form of a sticker, and wherein the sticker contains radio frequency resonant particles which can be read by a scanner.

21. The process according to claim 14, wherein the medallion is affixed to the security by an inked stamp and wherein the ink is unique to the signature guarantee program.

22. A system for electronically guaranteeing the signature on a security to be transferred, comprising:

an electronic storage system adapted to generate and store:
(a) a profile of an individual guarantor enrolled in a signature guarantee program, said profile being divided into fields which can be sorted and used to generate documents related to each guarantor,
(b) an identification number for each guarantor,
(c) a list of qualified guarantors for access by transfer agents;
(d) a locator code for an individual security transfer;
(e) a transfer agent code for identifying transfer agents; and
(f) a guarantor instruction file containing a stockholder's name, address, stock, certificate number, CUSIP number and transfer instructions;
a communications system connected to the storage system adapted to:
(a) transmit the list of guarantors to transfer agents and regulators;
(b) allow a guarantor access to the storage system through the use of the guarantor's identification number;
(c) transmit the locator code to a guarantor contacting the storage system to identify a particular stock transfer;
(d) receive instructions from a guarantor guaranteeing the validity of a stockholder's transfer request of an individual security, including stockholder's name and address, the security's certificate number, CUSIP number, transfer instructions, (f) and the transfer agent code;
(e) communicate said locator code to said guarantor, who can then communicate the locator code to a stockholders and transfer agents; and
(f) electronically transmit the instructions to a transfer agent upon receiving the locator code from a transfer agent,
wherein the signature on the transfer of a security is guaranteed by communicating the locator code to a transfer agent who can then use the locator code to locate the guarantor instructions in the storage system.

23. The system according to claim 22, further comprising an on-line access site connected to said communication system for accessing the list of qualified guarantors, said access site including a subdirectory corresponding to the transfer agent code for each transfer agent, said access site being adapted to receive guarantee instructions accompanied by a transfer agent code, and which subdirectory can then be accessed by the transfer agent to whom the subdirectory corresponds to verify a signature guarantee request.

24. The system according to claim 22, further comprising a public key/private key encryption mechanism adapted to encrypt the guarantor instructions to prevent unauthorized access, and decrypt the instructions upon receipt by the transfer agent.

25. The system according to claim 22, wherein the security certificate contains encrypted information identifying the certificate on its face, said encrypted information being in the form of radio frequency resonant material or a two-dimensional bar code, wherein the transfer agent file also contains the encrypted information from the security certificate,
such that a transfer agent receiving the certificate can scan the certificate and decrypt the encrypted information to verify the authenticity of the certificate, and can also decrypt the encrypted information received from the guarantor, and compare it with the information the transfer agent has on file to verify the validity of a guarantee and associated documents.

26. A process for electronically guaranteeing the signature on a security to be transferred, comprising the steps of:
creating and storing a profile of an individual guarantor enrolled in a signature guarantee program in an electronic storage medium, the profile containing information about the guarantor and being divided into fields which can be sorted and used to generate correspondence and order forms related to each guarantor, generating and storing personal identification numbers for each guarantor;

generating and storing a list of qualified guarantors for access by transfer agents and regulators;

generating a transfer agent code for each transfer agent in the program;

receiving and storing in said electronic storage medium instructions from a guarantor guaranteeing the validity of the signature on a security, said guarantor being granted access to the program by the guarantor's personal identification number, the instructions including the stockholder's name and address, the security's certificate number, CUSIP number and the transfer agent code;

generating a locator code for an individual security transfer upon receiving the guarantor's instructions;

transmitting the locator code to the guarantor who can then transmit the locator code to a stockholder;

transmitting the list of guarantors to transfer agents and regulators;

transmitting the instructions to a transfer agent upon receiving the locator code from the transfer agent; and guaranteeing the signature on a transfer of a security by presenting a security certificate and communicating the locator code to a transfer agent, who can then access the guarantor's instructions on the electronic storage medium.

27. The process according to claim 26, wherein the steps of receiving instructions from a guarantor and transmitting the instructions to a transfer agent is accomplished by an on-line computer network site, and further comprises the steps of:

transmitting guarantee instructions to the access site using a transfer agent code; and generating a transfer agent subdirectory in the access site corresponding to the transfer agent code for receiving the guarantee instructions;

wherein the subdirectory is accessed by the transfer agent to whom the subdirectory applies to verify a signature guarantee.

28. The process according to claim 26, further comprising providing encrypting means for encrypting the guarantee instructions to prevent unauthorized access, and providing means for decrypting said instructions once they are retrieved by the proper transfer agent.

29. The process according to claim 26, further comprising the step of embedding encrypted information in the form of radio frequency resonant material in a security certificate to create a unique electronic profile on said certificate, such that a guarantor can scan the certificate and include the electronic profile information in the guarantor's instructions, and a transfer agent receiving the guarantor's instructions and the security certificate can decrypt the information, scan the security certificate, decrypt the encrypted information embedded in the security certificate, and compare the guarantor information with the information scanned from the certificate to verify the authenticity of the certificate and of the guarantee.

30. The process according to claim 26, further comprising the step of embedding encrypted information identifying an individual security certificate within the certificate, in the form of a two dimensional bar code, such that a guarantor can scan the certificate and include the encrypted information in the guarantor's instructions, and a transfer agent receiving the guarantor's instructions can decrypt the information, scan the security certificate, decrypt the encrypted information from the security certificate, and compare the guarantor information with the information scanned from the certificate to verify the authenticity of the certificate and of the guarantee.

* * * * *